US012561325B1

(12) United States Patent
Dhaliwal et al.

(10) Patent No.: US 12,561,325 B1
(45) Date of Patent: Feb. 24, 2026

(54) QUERY PLAN VIEW FRAMEWORK FOR MANAGEMENT OF DATABASE QUERY PLANS

(71) Applicant: Snowflake Inc., Bozeman, MT (US)

(72) Inventors: Kavinder S. Dhaliwal, San Carlos, CA (US); Yongchul Kwon, Redmond, WA (US); Nicola Dan Onose, San Jose, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/977,104

(22) Filed: Dec. 11, 2024

(51) Int. Cl.
*G06F 16/00* (2019.01)
*G06F 16/22* (2019.01)
*G06F 16/2453* (2019.01)
*G06F 16/2455* (2019.01)

(52) U.S. Cl.
CPC .... *G06F 16/24544* (2019.01); *G06F 16/2246* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,185,000 B1 * | 2/2007 | Brown | G06F 16/24532 707/999.102 |
| 2007/0033159 A1 * | 2/2007 | Cherkauer | G06F 16/217 |
| 2009/0077013 A1 * | 3/2009 | Hu | G06F 16/24534 |

* cited by examiner

*Primary Examiner* — Anhtai V Tran
(74) *Attorney, Agent, or Firm* — Schwegman Lundberg & Woessner, P.A.

(57) ABSTRACT

Methods, systems, and computer programs are presented for generating and managing query plan representations using a unified framework based on a common query plan configuration. The system includes a memory with instructions and one or more computer processors. The instructions, when executed, cause the system to provide a user interface (UI) for a development tool to create a configuration for a plan builder. The UI offers options to create a plurality of query plans, including a logical query plan, a physical query plan, a query plan hash, and a query plan signature. The system receives parameters to create the configuration and select a query plan from the plurality of query plans. The system generates a first query plan based on the parameters and causes the presentation of the first query plan on a display.

20 Claims, 10 Drawing Sheets

LOGICAL QUERY PLAN

102

104 — RESULT [0]
DIACODES.CLAIMID ASC NULLS LAST, DIA...                    0%

106 — SORT[1]
DIACODES.CLAIMID ASC NULLS LAST, DIA...                    0%

108 — JOIN [2]
DIACODES.CONTEXTID = ICD.CONTEXTID...                      0%

112 — SECUREVIEW[6]
COMPANY.DIVISION.ICDCODEALL...                            36%

SECUREVIEW[5]
COMPANY.DIVISION.CLAIMDIAGRAM...                           5.4%

110 — JOIN [3]
(CLAIM.CLAIMID = DIACODES.CLAIMID) A...                    2.7%

SECUREVIEW[4]
COMPANY.DIVISION.CLAIM                                    36.9%

32

32

26

26

32

16

PHYSICAL QUERY PLAN

500

PROVIDE DEVELOPMENT INTERFACE FOR THE PLAN VIEW BUILDER TO CONFIGURE PARAMETERS FOR A PLAN VIEW — 502

RECEIVE PLAN VIEW CONFIGURATION IN THE UI TO GENERATE ONE OR MORE VARIANTS — 504

RECEIVE PARAMETERS FOR USE CASE          RECEIVE PARAMETERS FOR USE CASE — 506

000

MULTIPLE USE CASES

GENERATE PLAN VIEW BASED ON PARAMETERS          000          GENERATE PLAN VIEW BASED ON PARAMETERS — 508

602

| USE CASE | BASE PLAN REPRESENTATION | TYPE | PLAN/ FRAGMENT | REDACTION |
|---|---|---|---|---|
| QUERY PROFILE | EXTERNAL | VIEW | PLAN | YES |
| PUBLIC PLAN HASH | EXTERNAL | HASH | PLAN | YES |
| FRAGMENT HASH | PHYSICAL | HASH | FRAGMENT | NO |
| ARBITRARY SUBTREE HASH | LOGICAL | HASH | FRAGMENT | NO |
| OFFLINE ANALYSIS HASH | EXTERNAL | HASH | PLAN | NO |
| INTERNAL ON-DEMAND HASH | LOGICAL/PHYSICAL | VIEW/HASH | BOTH | NO |
| RESULT CACHE HASH | PHYSICAL | HASH | PLAN | NO |

FIG. 6

```
PlanViewBuilder(
  PlanViewType type, // The base foundation of the view
  boolean defaultExclusive // Optional: Whether the builder defaults to inclusion
    or exclusion for nodes
  boolean enableVersioning // Optional: If versioning is enabled, then the hash of
    the PlanViewGenerator (output of the builder) is included in the plan view hash
)

/** Configuration Interface */ includeScan(
  fields=List<PlanViewField>, // Optional: Fields of QueryPlanNodeBaseTableScan
    to include in the view
  filer=Predicate<QueryPlanNodeBaseTableScan> // Optional: predicate on
    properties of a specific instance of the node. (e.g table type, cardinality, etc)
)
  :
```

FIG. 7

```
//Use case

PlanView view = PlanViewBuilder.basePlan(External)

.withVersion(V1)
.applyNormalizationRules(
    {Rules}
)
.applyGroupings(
    {GroupingRules}
)
.excludeNode(<
    NODE_NAME>, () -> {<filter_condition>}
)
.buildView();
```

FIG. 8

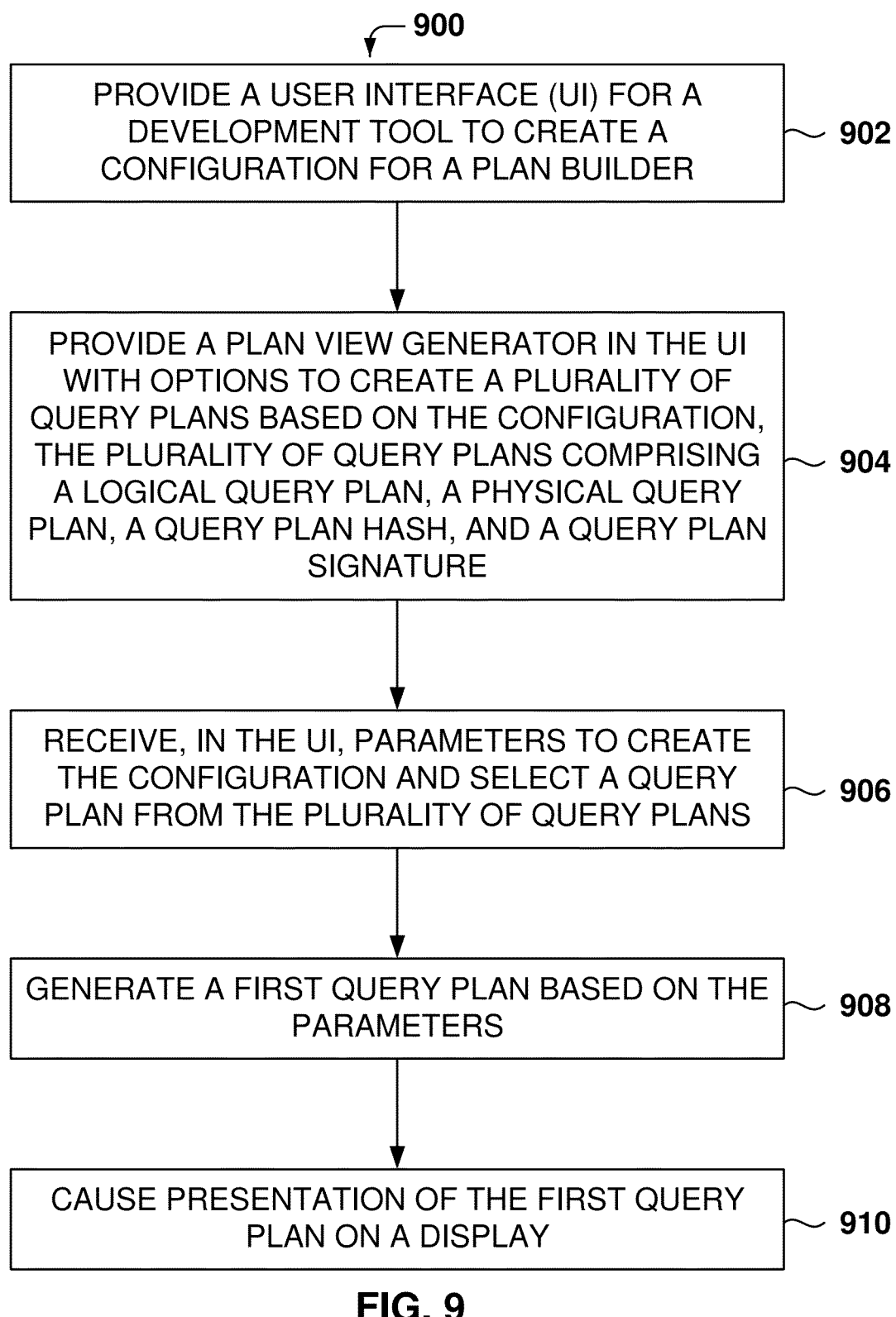

┌─ 900

PROVIDE A USER INTERFACE (UI) FOR A
DEVELOPMENT TOOL TO CREATE A
CONFIGURATION FOR A PLAN BUILDER        ～ 902

PROVIDE A PLAN VIEW GENERATOR IN THE UI
WITH OPTIONS TO CREATE A PLURALITY OF
QUERY PLANS BASED ON THE CONFIGURATION,
THE PLURALITY OF QUERY PLANS COMPRISING        ～ 904
A LOGICAL QUERY PLAN, A PHYSICAL QUERY
PLAN, A QUERY PLAN HASH, AND A QUERY PLAN
SIGNATURE

RECEIVE, IN THE UI, PARAMETERS TO CREATE
THE CONFIGURATION AND SELECT A QUERY        ～ 906
PLAN FROM THE PLURALITY OF QUERY PLANS

GENERATE A FIRST QUERY PLAN BASED ON THE        ～ 908
PARAMETERS

CAUSE PRESENTATION OF THE FIRST QUERY        ～ 910
PLAN ON A DISPLAY

FIG. 9

QUERY PLAN VIEW FRAMEWORK FOR MANAGEMENT OF DATABASE QUERY PLANS

TECHNICAL FIELD

The subject matter disclosed herein generally relates to database systems, specifically to frameworks for generating and managing query plan representations.

BACKGROUND

In database systems, the generation and representation of query execution plans pose significant challenges. These strategies dictate the order of execution to answer a database query and exist in various forms throughout the query lifecycle. These forms include logical and physical operations over data, each serving distinct purposes in processing.

Existing solutions often involve disparate implementations for each representation of the query plan, leading to maintenance challenges and inconsistencies. Each representation, whether for hashing, signature generation, or visual representation, requires specific logic, complicating the process of ensuring consistency and reliability. This fragmented approach makes extending existing functionalities or introducing new use cases difficult as developers navigate isolated codebases without shared logic.

BRIEF DESCRIPTION OF THE DRAWINGS

Various appended drawings illustrate examples of the present disclosure and cannot be considered limiting its scope.

FIG. 6 is a table describing use cases for query plan representation, according to some examples.

FIG. 7 shows the top part of the user interface for the plan view builder, according to some examples.

FIG. 8 shows an example of creating an external plan with a grouping of fragments, according to some examples.

FIG. 9 is a flowchart of a method for generating a query plan representation based on a common query plan configuration, according to some examples.

DETAILED DESCRIPTION

Figure 1:
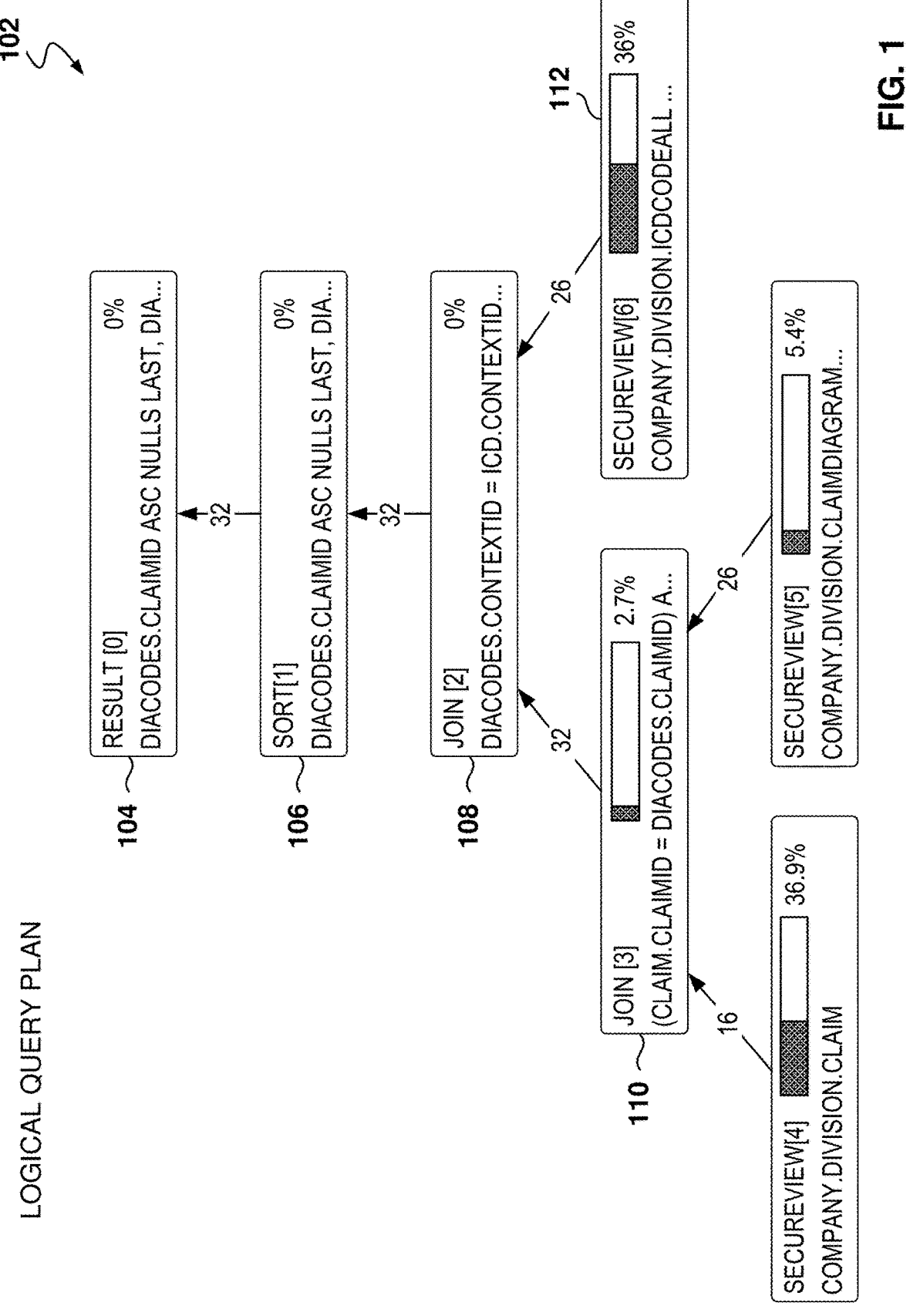
FIG. 1 shows a logical query plan structure, according to some examples.

Example methods, systems, and computer programs are directed at generating and managing query plan representations using a unified framework based on a common query plan configuration. Examples merely typify possible variations. Unless explicitly stated otherwise, components and functions are optional and may be combined or subdivided, and operations may vary in sequence or be combined or subdivided. The following description provides numerous specific details to provide a thorough understanding of examples. However, it will be evident to one skilled in the art that the present subject matter may be practiced without these specific details.

The proposed solution unifies the representation of query plans through a single, extensible framework. This framework treats query plans as views, allowing for a declarative definition of plan views without concern for the underlying implementation. Query plan variants are created as different views of the same underlying query plan view configuration. This approach allows for a declarative definition of plan views, decoupling the definition from the underlying implementation. This is a novel method for generating views and hashes in database systems, providing a unified framework that enhances consistency, reliability, and extensibility across various use cases.

By decoupling the definition of a plan view from the generation of the plan view, the framework enables developers to focus on their specific requirements while ensuring consistency and reliability across multiple use cases. This approach not only simplifies the development process but also enhances the maintainability and extensibility of query plan representations.

In some aspects, the techniques described herein relate to a system including one or more computer processors; and a memory comprising instructions that, when executed by the one or more computer processors, cause the system to perform operations comprising: providing a user interface (UI) for a development tool to create a configuration for a plan builder; providing a plan view generator in the UI with options to create a plurality of query plans based on the configuration, the plurality of query plans comprising a logical query plan, a physical query plan, a query plan hash, and a query plan signature; receiving, in the UI, parameters to create the configuration and select a query plan from the plurality of query plans; generating a first query plan based on the parameters; and causing presentation of the first query plan on a display.

Some of the concepts used for the description of the solution are presented below.

Query Plan: sequence of operations used to execute a database query.

Logical Query Plan: representation of the query plan focusing on the logical operations to execute a query without specifying execution details.

Physical Query Plan: detailed representation of the query plan that includes the execution operations to implement the query plan and the operators used to process the data at the different stages.

Plan View: visual representation of a query plan. The plan view presents an interface that provides access to certain properties of the plan and may hide details of its implementation. Multiple plan views can be built from the same source-of-truth query plan.

Plan View Builder (PlanViewBuilder): tool for defining the configuration of a plan view, specifying customization rules such as normalization and redaction.

Plan View Generator (PlanViewGenerator): component that produces a plan view based on the configuration defined by the plan view builder.

Variants: representations of a query plan with different configurations. These variants are created to serve specific purposes, such as hashing, signature generation, or visual representation, while maintaining consistency and reliability across various use cases.

Normalization: process of standardizing expressions within a query plan to ensure consistency.

Parameterization: process of abstracting literals in a query plan to create a more generalized representation.

Redaction: removal or masking of sensitive information within a query plan.

Grouping: consolidation of multiple operators or expressions into a single logical unit within a query plan.

Plan Hash: consistent hash value generated from a plan view, used for tracking changes and ensuring consistency.

Signature: string representation of a query plan used for matching and comparison purposes.

Grouping: process of consolidating multiple operators or expressions into a single logical unit within a query plan.

Customization rules: independent, composable units that apply specific modifications to the base inputs of a query plan view, including normalization, parameterization, redaction, and grouping.

Application Programming Interface (API): set of protocols, routines, and tools for building software and applications, allowing different software entities to communicate with each other.

FIG. 1 shows a logical query plan structure, according to some examples. A query plan is a sequence of operations used to execute a database query. The query plan helps users and database administrators understand how the database engine processes a query, enabling performance optimization and troubleshooting. A logical query plan is a representation of the query plan focusing on the logical operations to execute a query, without specifying execution details.

In some examples, the execution plan is generated before a query is run and shows various operations that the database engine will take, such as access paths (how the data is retrieved from tables or external sources), join methods (if the query involves multiple tables, the query plan will show how the tables are joined), data movement (how the system moves and partitions data across the distributed architecture), cost estimates (estimated computational cost associated with each operation), filtering (how data is filtered, e.g., WHERE conditions) and aggregation (how data is aggregated, e.g., GROUP BY or DISTINCT).

For example, a simple SQL query may be as follows:

SELECT customer_id, SUM(order_amount)
FROM orders
WHERE order_date>'2023-01-1'
GROUP BY customer_id;

The plan view for this query might look like the following operations, presented from bottom to top:

1. Scan (ORDERS Table)—perform a table scan on the ORDERS table to retrieve records from the table where order_date>'2023-01-01'.
2. Filter (WHERE Condition)—filtering based on the WHERE condition to remove rows where order_date does not meet the condition.
3. Group By (customer_id)—group the remaining rows by customer_id and calculate the SUM(order_amount) for each customer_id.
4. Result Output—show how the results are returned to the user.

The visual representation of this plan would include four operations in a sequence presented in vertical order: Scan ORDERS; Filter WHERE order_date>'2023-01-01'; Group By customer_id+Aggregate SUM(order_amount); and Return Results.

The metrics of this query plan would include rows scanned (how many rows were scanned from the ORDERS table), rows filtered (how many rows passed through the filter condition), rows output (number of rows produced after grouping and aggregation), and time spent (the amount of time each operation took).

As queries become more complex, the query plan will become more complex, including joins, accessing multiple tables, etc. This will create plan views where nodes have more than one child, as the work depends on the results obtained from the multiple children nodes.

FIG. 1 illustrates a logical query plan 102 that is more complex than the plan previously described. The top node 104 presents the results based on the sort of data at node 106. The data sorted by node 106 is the result of a join performed by node 108. The node 108 receives the data from node 110 and 112 and then performs the join. Further, node 110 also performs a join from the data provided by the two nodes below.

Sometimes, security policies dictate that some operations remain secure and hidden. Node 112 corresponds to a secure view to access data, but details on the data access are not presented.

In some examples, the logical query plan is presented while the query is being performed, and each node shows the progress made toward completion (e.g., 0%, 2.7%, 36%). Further, a progress bar may be presented within the node to keep the visual representation of the progress.

In the logical query plan 102, the user may see that there is a join, but the details on how the database does the join are not provided. On the other hand, a physical query plan, such as the one presented below in FIG. 2, does include the implementation details. However, the physical query plan is typically internal to the database provider and not shown to the user.

Customers want to examine the logical query plan 102 due to its relevance to performance sensitivity, with a secondary emphasis on correctness. A customer may execute a query that takes an excessive duration to return results. Consequently, systems typically provide a live view of the query plan, offering an indication of the current progress and subsequently indicating where time was expended. For instance, if a customer applies a filter to a query with the expectation of completion in n minutes but observes that it took n hours, the customer can refer to such a view to discover that the query unintentionally read all available data instead of the anticipated single file.

The logical query plan 102 provides information about performance. Additionally, with respect to accuracy, when an incorrect result is observed, there may be an interest in questioning the outcome, such as expecting only ten rows from a table but observing 16 rows instead.

The compiler keeps this representation in memory in its own data structure, and then it will apply transformations to optimize the query plan. When that optimization is complete, these logical operators become physical ones, like in the physical query plan discussed below. Subsequently, the in-memory representation will depict a join not as a singular operator or node, but as a collection of nodes. Throughout this compilation process, various variants of the query plan are generated.

Variants are different representations or versions of a query plan generated from a common query plan configuration. These variants are created to serve specific purposes, such as hashing, signature generation, or visual representation, while maintaining consistency and reliability across various use cases. The logical query plan 102 is one of the possible variants, and the physical query plan is another variant.

In certain instances, concerns related to security exist, so a secure view is implemented as a variant. This implies that guarantees are provided to users that the system does not reveal what lies beneath a specified boundary, as well as the sub-tree located beneath this boundary. The compiler has the responsibility for optimizing the primary query plan and also for generating these types of variants. The variants possess distinct requirements and produce different outputs.

Hashing may be also be performed for a variant. To generate a hash, an alternative form of the query plan is built, and all components deemed relevant are hashed. Various types of hashes can be derived from a query plan. One approach involves including all details, such as hashing the complex tree; however, this method exhibits sensitivity to changes that may lack relevance. Another approach involves hashing the simple tree, which demonstrates greater adaptability to changes at the physical level and may hold relevance to users.

Users may request a hash of displayed information to enable programmatic verification of query executions. This facilitates the identification of the query type, expected execution plan, and anticipated performance outcomes. Upon observing a query plan alteration and subsequent performance regression, users may choose to contact support services. From a programmatic access standpoint, a hash is considered more practical than a visual examination of query plans.

Another variant that is generated is called a signature. This signature variant is a string representation of the basic tree structure. Such a representation is valuable for aligning previous plans with the current plan. In certain use cases, the signature offers more utility than hashes.

In some implementations, each variant is designed and supported independently, maybe by different development teams, without sharing any logic with other components. Thus, there may be many different representations of a query plan.

The solutions presented provide consolidation of the various query plan representations that are maintained and provide a unified framework that suits all use cases for the different variants. More details on some example use cases are described below with reference to FIG. 6.

All the use cases utilize an examination of the query plan that includes a specific subset of pertinent details. The existence of multiple methods to fulfill this requirement presents a development challenge. The components that contribute to the construction of a plan hash are not prioritized within the compiler infrastructure, consequently requiring each use case to incorporate substantial logic to guarantee that the correct set of information is encompassed within the hash. This situation complicates the process of determining the construction locations of plan hashes and plan variants, as well as understanding the potential impact of modifications on all users.

Similarly, the process of masking sensitive data or normalizing expressions updates code in several locations due to the absence of a unified method to ensure consistent behavior across all instances of an object. To implement new use cases, the developer has to utilize a legacy framework, which possesses several limitations, or begin anew at the foundational level with custom plan nodes.

However, with the current solution, these problems are solved by utilizing a common framework for the development of multiple variants.

Figure 2:
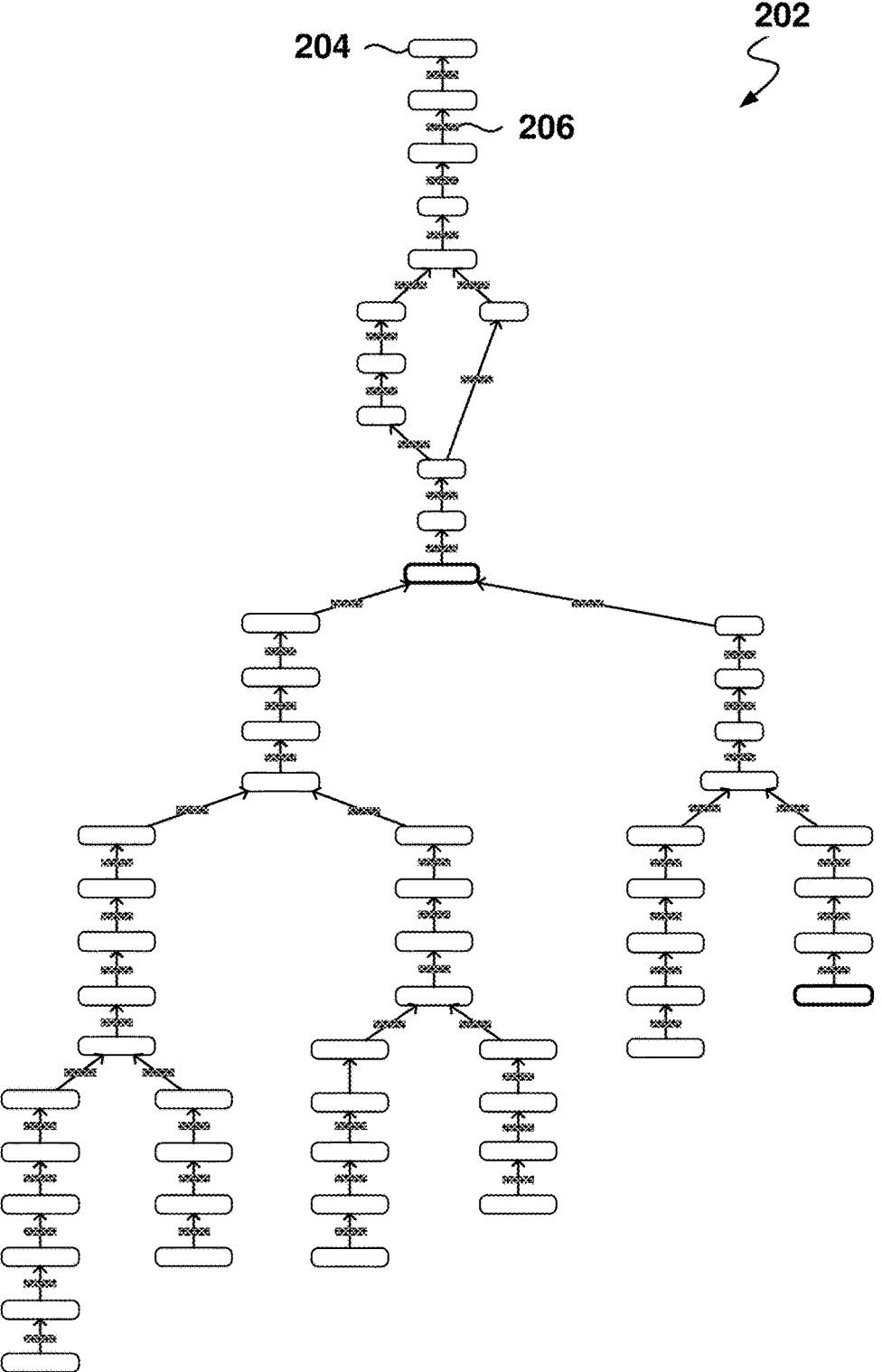
FIG. 2 shows a physical query plan structure, according to some examples.

FIG. 2 shows a physical query plan 202, according to some examples. The physical query plan 202 is a detailed representation of the query plan that includes the execution operations to implement the query plan and the operators used to process the data at the different stages. The physical query plan 202 specifies the exact methods and resources used for executing a database query, such as join algorithms, access paths, and data movement techniques.

The physical query plan 202 outlines how a database query will be executed, specifying the exact methods and resources used, such as join algorithms, access paths, and data movement techniques. Unlike a logical query plan, which focuses on the logical operations to execute a query, the physical query plan provides the implementation details for execution.

The illustrated example shows the operations of the physical query plan 202 organized in a logical tree, where a leaf node performs an operation on the data, such as access to a database; an intermediate node receives data 206 from the node or nodes below, performs an operation on the data, and then passes the data 206 to the parent node; and the root node returns the results of the query.

Some of the operations performed by the nodes include sorting data, partitioning data, filtering data, applying a runtime join filtering, buffering data, selecting data (e.g., projection, sampling), joining data (e.g., data provided by two children nodes), splitting data, perform a hash join, etc. The database executes the query by following the operations described in the physical query plan 202.

The node 204, also referred to as the query plan node or QueryPlanNode, is the source of truth for operator-level information. The plan view framework delegates to the query plan node to build its corresponding plan view node, normalize and parameterize its expressions, and produce its hash. In some examples, an Application Programming Interface (API) is provided to generate the query plan node or the nodes for the logical query plan 102.

There are two components used for the definition of a query plan and the generation of the query plan: a plan view builder, referred to as PlanViewBuilder, and a plan view generator, referred to as PlanViewGenerator.

The PlanViewBuilder is a tool for defining the configuration of a plan view specifying customization rules such as normalization and redaction. In some examples, a Domain-Specific Language (DSL) type of interface is provided for the users of the framework to configure their view or hash and customize any generation behavior. An invocation of the PlanViewBuilder is used to build a declarative definition of what a specific view or hash contains.

The PlanViewGenerator is a program that produces a plan view based on the configuration defined by the plan view builder. The PlanViewGenerator is responsible for producing a view or hash according to a specific use case.

Additionally, customization rules may be used to apply some desired customization to the base inputs of the view. The customization rules are independent, composable units. Some examples of customization rules include:

Normalization to normalize expressions to a canonical representation;

Parameterization is the process of abstracting literals in a query plan to create a more generalized representation., such as removing constants and literals;

Redaction to remove or mask sensitive information in a query plan; and

Grouping to consolidate multiple operators or expressions into a single logical unit.

Figure 3:
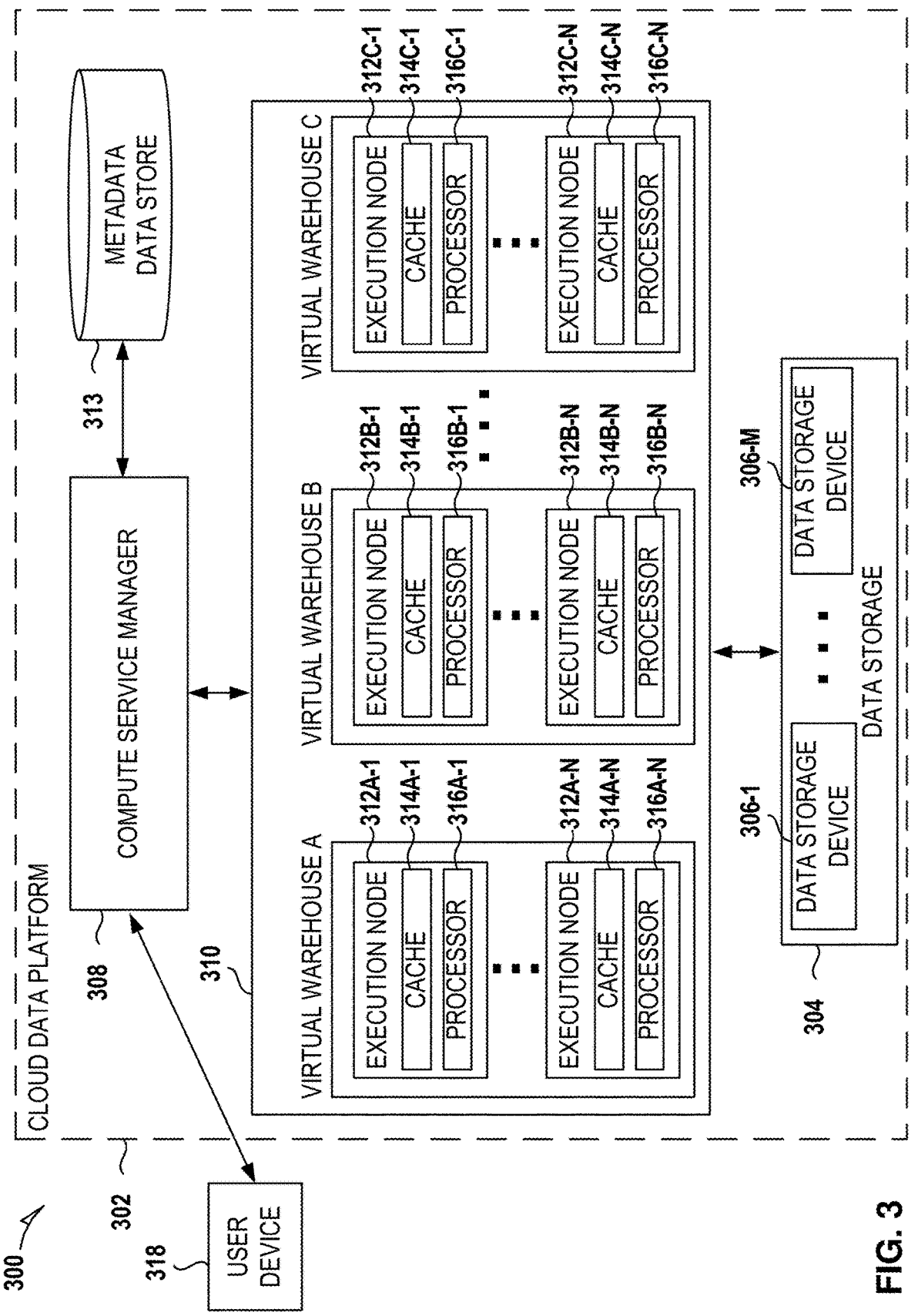
FIG. 3 illustrates a computing environment that includes a cloud data platform, according to some examples.

FIG. 3 illustrates a computing environment 300 that includes a cloud data platform 302, according to some examples. To avoid obscuring the inventive subject matter with unnecessary detail, various functional components that are not germane to conveying an understanding of the inventive subject matter have been omitted from FIG. 3. However, a skilled artisan will readily recognize that various additional functional components may be included as part of the computing environment 300 to facilitate additional functionality that is not specifically described herein.

As shown, the cloud data platform 302 comprises a three-tier architecture: a compute service manager 308 coupled to a metadata data store 313, an execution platform 310, and data storage 304. The cloud data platform 302 hosts and provides data access, management, reporting, and analysis services to multiple client accounts. Administrative users can create and manage identities (e.g., users, roles, and groups) and use permissions to allow or deny access to the identities to resources and services. The cloud data platform 302 is used for reporting and analysis of integrated data from one or more disparate sources, including storage devices within the data storage 304. The data storage 304 comprises a plurality of computing machines and provides on-demand data storage resources to the cloud data platform 302.

The compute service manager 308 includes multiple services that coordinate and manage operations of the cloud data platform 302. For example, the compute service manager 308 is responsible for performing query optimization and compilation as well as managing clusters of compute nodes that perform query processing (also referred to as "virtual warehouses"). The compute service manager 308 can support any number of client accounts, such as end users providing data storage and retrieval requests, system administrators managing the systems and methods described herein, and other components/devices that interact with compute service manager 308.

The compute service manager 308 is also coupled to the metadata data store 313. The metadata data store 313 stores metadata pertaining to various functions and aspects associated with the cloud data platform 302 and its users. The metadata data store 313 also includes a summary of data stored in data storage 304 as well as data available from local caches. Additionally, the metadata data store 313 includes information regarding how data is organized in the data storage 304 and the local caches.

The compute service manager 308 is in communication with a user device 318. The user device 318 corresponds to a user of one of the multiple client accounts supported by the cloud data platform 302. In some implementations, the compute service manager 308 does not receive any direct communications from the user device 318 and only receives communications concerning jobs from a queue within the cloud data platform 302.

The compute service manager 308 is coupled to the metadata data store 313. The metadata data store 313 stores metadata pertaining to various functions and aspects associated with the cloud data platform 302 and its users. The metadata data store 313 also includes a summary of data stored in data storage 304 as well as data available from local caches. Additionally, the metadata data store 313 includes information regarding how data is organized in the data storage 304 and the local caches.

The compute service manager 308 is further coupled to the execution platform 310, which includes multiple virtual warehouses (computing clusters) that execute various data storage and data retrieval tasks. As an example, a set of processes on a compute node executes at least a portion of a query plan compiled by the compute service manager 308. As shown, the execution platform 310 includes virtual warehouse A, virtual warehouse B, and virtual warehouse C. Each virtual warehouse includes multiple execution nodes, each with a data cache and a processor. For example, as shown, virtual warehouse A includes execution nodes 312A-1 to 312A-N; execution node 312A-1 includes a cache 314A-1 and a processor 316A-1; and execution node 312A-N includes a cache 314A-N and a processor 316A-N. Similarly, in this example, virtual warehouse B includes execution nodes 312B-1 to 312B-N; execution node 312B-1 includes a cache 314B-1 and a processor 316B-1; and execution node 312B-N includes a cache 314B-N and a processor 316B-N. Additionally, virtual warehouse C includes execution nodes 312C-1 to 312C-N; execution node 312C-1 includes a cache 314C-1 and a processor 316C-1; and execution node 312C-N includes a cache 314C-N and a processor 316C-N.

Each execution node of the execution platform 310 is configured to process data storage and retrieval tasks. Hence, the virtual warehouses can execute multiple tasks in parallel utilizing the multiple execution nodes. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

In some examples, the execution nodes of the execution platform 310 are stateless with respect to the data the execution nodes are caching. That is, the execution nodes do not store or otherwise maintain state information about the execution node or the data being cached by a particular execution node, in these examples. Thus, in the event of an execution node failure, the failed node can be transparently replaced by another node. Since there is no state information associated with the failed execution node, the new (replacement) execution node can easily replace the failed node without concern for recreating a particular state.

The execution platform 310 may include any number of virtual warehouses. Additionally, the number of virtual warehouses in the execution platform 310 is dynamic, such that new virtual warehouses are created when additional processing and/or caching resources are needed. Similarly, existing virtual warehouses may be deleted when the resources associated with the virtual warehouse are no longer necessary.

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary. Additionally, although the execution nodes shown in the example of FIG. 3 each include a single data cache and a single processor, in other examples, execution nodes can contain any number of processors and any number of caches. Also, the caches may vary in size among the different execution nodes.

In some examples, the virtual warehouses of the execution platform 310 operate on the same data, but each virtual warehouse has its own execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Although virtual warehouses A, B, and C are illustrated with an association with the same execution platform 310, the virtual warehouses may be implemented using multiple computing systems at multiple geographic locations. For example, virtual warehouse A can be implemented by a computing system at a first geographic location, while virtual warehouses B and C are implemented by another computing system at a second geographic location. In some examples, these different computing systems are cloud-based computing systems maintained by one or more different entities.

The execution platform 310 is coupled to data storage 304. The data storage 304 comprises multiple data storage devices 306-1 to 306-M. In some embodiments, the data storage devices 306-1 to 306-M are cloud-based storage devices located in one or more geographic locations. For example, the data storage devices 306-1 to 306-M may be part of a public cloud infrastructure or a private cloud infrastructure. The data storage devices 306-1 to 306-M may be hard disk drives (HDDs), solid state drives (SSDs), storage clusters, Amazon S3™ storage systems, or any other data storage technology. Additionally, the data storage 304 may include distributed file systems (e.g., Hadoop Distributed File Systems (HDFS)), object storage systems, and the like. In some examples, the storage devices 306-1 to 306-M are managed and provided by a third-party data storage platform (e.g., AWS®, Microsoft Azure Blob Storage®, or Google Cloud Storage®).

Each virtual warehouse can access any of the data storage devices 306-1 to 306-M shown in FIG. 3. Thus, the virtual warehouses are not necessarily assigned to a specific data storage device 306-1 to 306-M and, instead, can access data from any of the data storage devices 306-1 to 306-M within the data storage 304. Similarly, each of the execution nodes shown in FIG. 3 can access data from any of the data storage devices 306-1 to 306-M. In some examples, a particular virtual warehouse or a particular execution node may be temporarily assigned to a specific data storage device, but the virtual warehouse or execution node may later access data from any other data storage device.

In some examples, communication links between elements of the computing environment 300 are implemented via one or more data communication networks. These data communication networks may utilize any communication protocol and any type of communication medium. In some examples, the data communication networks are a combination of two or more data communication networks (or sub-networks) coupled to one another.

As shown in FIG. 3, the data storage devices 306-1 to 306-M are decoupled from the computing resources associated with the execution platform 310. This architecture supports dynamic changes to the cloud data platform 302 based on the changing data storage/retrieval needs as well as the changing needs of the users and systems. The support of dynamic changes allows the cloud data platform 302 to scale quickly in response to changing demands on the systems and components within the cloud data platform 302. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

During typical operation, the cloud data platform 302 processes multiple jobs determined by the compute service manager 308. These jobs are scheduled and managed by the compute service manager 308 to determine when and how to execute the job. For example, the compute service manager 308 may divide the job into multiple discrete tasks and may determine what data is needed to execute each of the multiple discrete tasks. The compute service manager 308 may assign each of the multiple discrete tasks to one or more execution nodes of the execution platform 310 to process the task. The compute service manager 308 may determine what data is needed to process a task and further determine which nodes within the execution platform 310 are best suited to process the task. Some nodes may have already cached the data needed to process the task and, therefore, be a good candidate for processing the task. Metadata stored in the metadata data store 313 assists the compute service manager 308 in determining which nodes in the execution platform 310 have already cached at least a portion of the data needed to process the task. One or more nodes in the execution platform 310 processes the task using data cached by the nodes and, if necessary, data retrieved from the data storage 304.

The compute service manager 308, metadata data store 313, execution platform 310, and data storage 304 are shown in FIG. 3 as individual discrete components. However, each of the compute service manager 308, metadata data store 313, execution platform 310, and data storage 304 may be implemented as a distributed system (e.g., distributed across multiple systems/platforms at multiple geographic locations). Additionally, each of the compute service manager 308, metadata data store 313, execution platform 310, and data storage 304 can be scaled up or down (independently of one another) depending on changes to the requests received and the changing needs of the cloud data platform 302. Thus, in the described embodiments, the cloud data platform 302 is dynamic and supports regular changes to meet the current data processing needs.

As shown in FIG. 3, the computing environment 300 separates the execution platform 310 from the data storage 304. In this arrangement, the processing resources and cache resources in the execution platform 310 operate independently of the data storage devices 306-1 to 306-M in the data storage 304. Thus, the computing resources and cache resources are not restricted to specific data storage devices 306-1 to 306-M. Instead, all computing resources and all cache resources may retrieve data from and store data to any of the data storage resources in the data storage 304.

Figure 4:
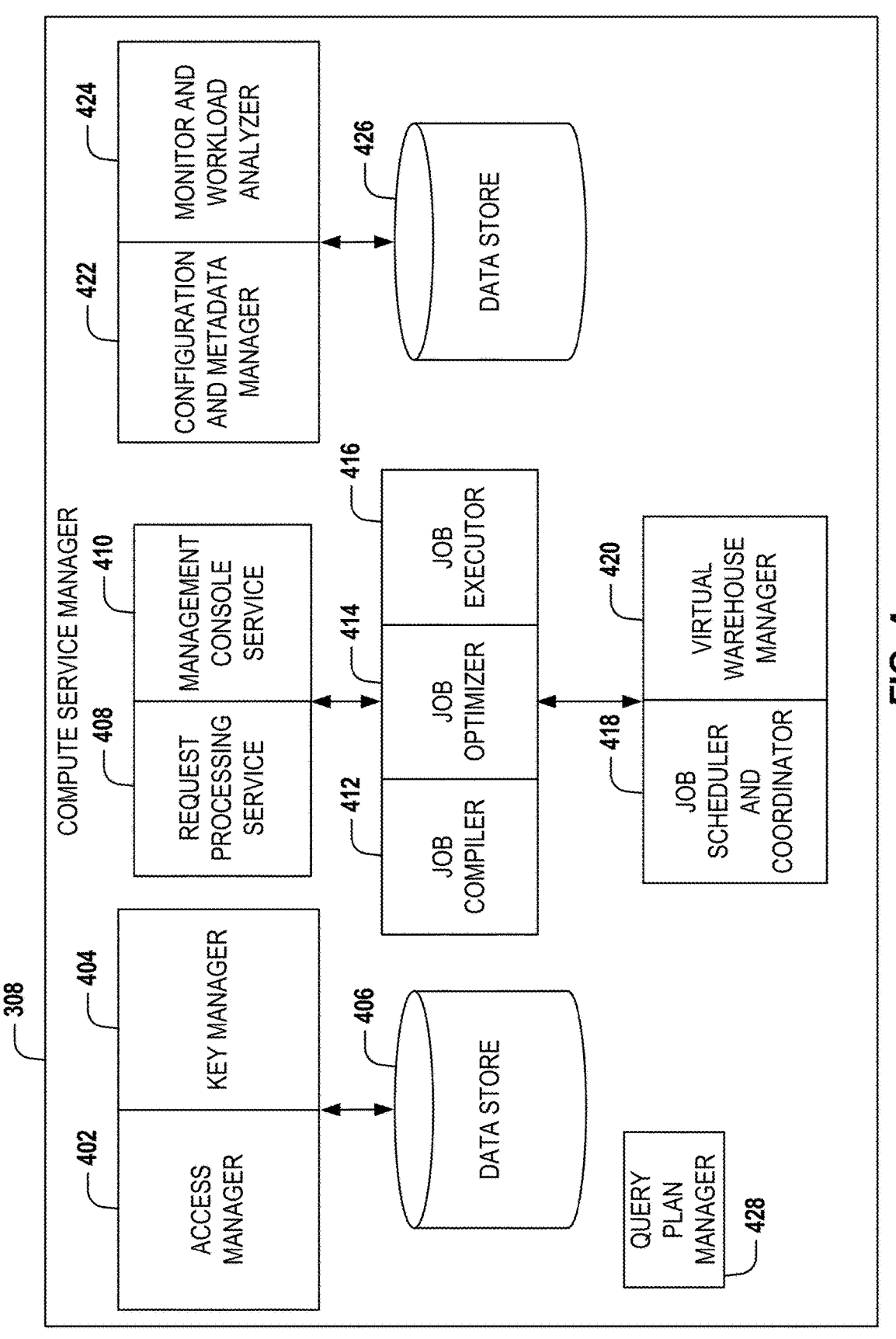
FIG. 4 is a block diagram illustrating components of a compute service manager of the cloud data platform, according to some examples.

FIG. 4 is a block diagram illustrating components of the compute service manager 308 of the cloud data platform, according to some examples. As shown in FIG. 4, the compute service manager 308 includes an access manager 402 and a key manager 404 coupled to a data store 406 that stores access information. Access manager 402 handles authentication and authorization tasks for the systems described herein. A query plan manager 428 manages operations related to query plans, such as providing a user interface (UI) to build a plan configuration, providing a UI to view plan views, generating views, and executing query plans.

Key manager 404 manages the storage and authentication of keys used during authentication and authorization tasks. For example, access manager 402 and key manager 404 manage the keys used to access data stored in remote storage devices (e.g., data storage devices in data storage 304).

A request processing service 408 manages received data storage requests and data retrieval requests (e.g., jobs to be performed on database data). For example, the request processing service 408 may determine the data necessary to process a received query (e.g., a data storage request or data retrieval request). The data may be stored in a cache within the execution platform 310 or in a data storage device in data storage 304.

A management console service 410 supports access to various systems and processes by administrators and other system managers. Additionally, the management console service 410 may receive a request to execute a job and monitor the workload on the system.

The compute service manager 308 also includes a job compiler 412, a job optimizer 414, and a job executor 416. The job compiler 412 parses a job into multiple discrete tasks and generates the execution code for each of the multiple discrete tasks. The job optimizer 414 determines the best method to execute the multiple discrete tasks based on the data that needs to be processed. The job optimizer 414 also handles various data pruning operations and other data optimization techniques to improve the speed and efficiency of executing the job. The job executor 416 executes the execution code for jobs received from a queue or determined by the compute service manager 308.

A job scheduler and coordinator 418 sends received jobs to the appropriate services or systems for compilation, optimization, and dispatch to the execution platform 310. For example, jobs may be prioritized and processed in that prioritized order. In some examples, the job scheduler and coordinator 418 identifies or assigns particular nodes in the execution platform 310 to process particular tasks.

A virtual warehouse manager 420 manages the operation of multiple virtual warehouses implemented in the execution platform 310. As discussed below, each virtual warehouse includes multiple execution nodes that each include a cache and a processor.

Additionally, the compute service manager 308 includes a configuration and metadata manager 422, which manages the information related to the data stored in the remote data storage devices and in the local caches (e.g., the caches in execution platform 310). The configuration and metadata manager 422 uses the metadata to determine which storage units need to be accessed to retrieve data for processing a particular task or job. A monitor and workload analyzer 424 oversees processes performed by the compute service manager 308 and manages the distribution of tasks (e.g., workload) across the virtual warehouses and execution nodes in the execution platform 310. The monitor and workload analyzer 424 also redistributes tasks, as needed, based on changing workloads throughout the cloud data platform 302 and may further redistribute tasks based on a user (e.g., "external") query workload that may also be processed by the execution platform 310. The configuration and metadata manager 422 and the monitor and workload analyzer 424 are coupled to a data store 426. Data store 426 in FIG. 4 represents any data repository or device within the cloud data platform 302. For example, data store 426 may represent caches in execution platform 310, storage devices in data storage 304, the metadata data store 313, or any other storage device or system.

Figure 5:
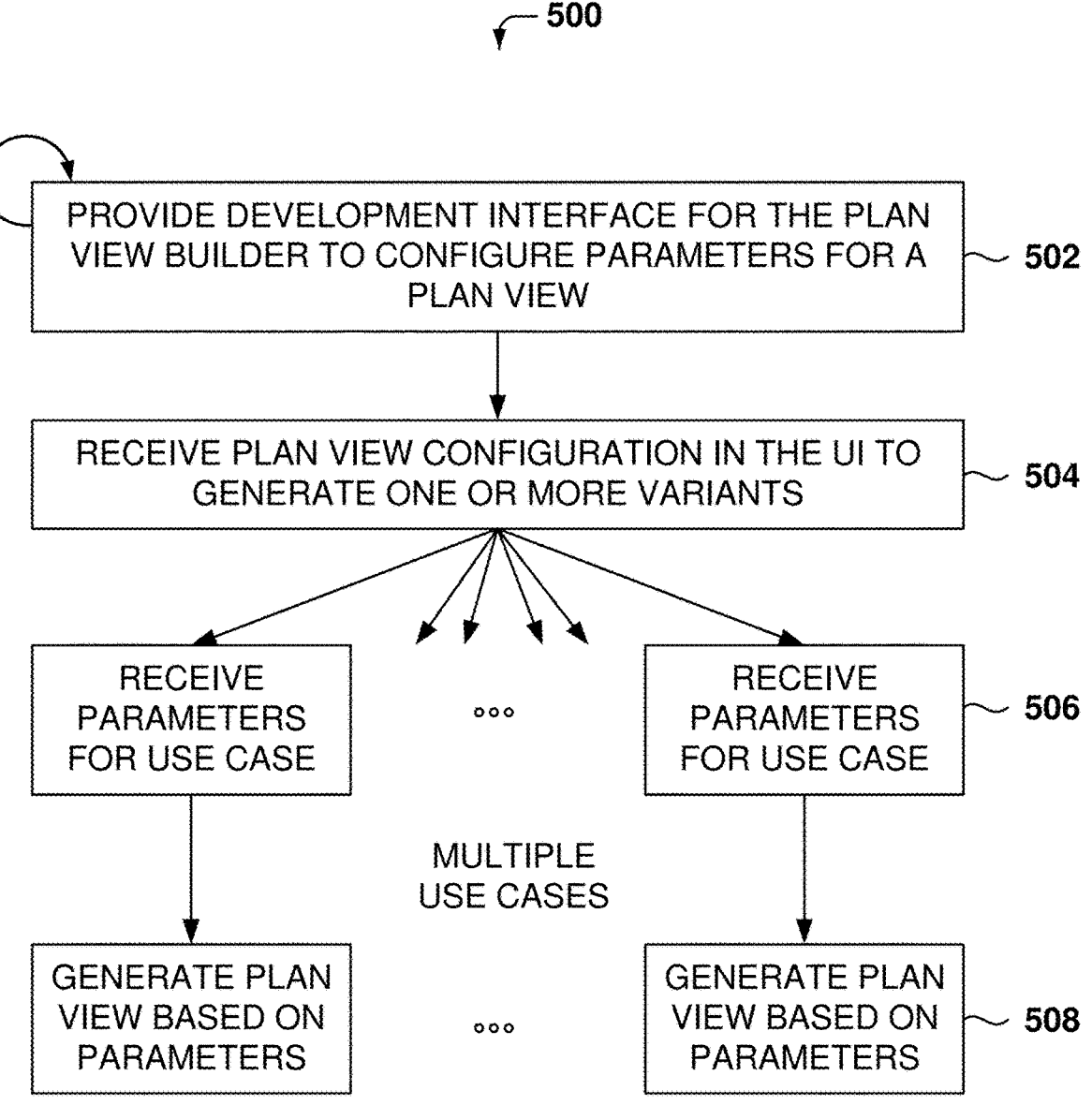
FIG. 5 is a flowchart of a method for creating query plan representations based on a common query plan configuration, according to some examples.

FIG. 5 is a flowchart of a method 500 for creating query plan representations based on a common query plan configuration, according to some examples. While the various operations in this flowchart are presented and described sequentially, one of ordinary skill will appreciate that some or all of the operations may be executed in a different order, be combined or omitted, or be executed in parallel.

At operation 502, the system provides a development interface for the plan view builder to configure parameters for the plan view. Operation 502 may be performed multiple times to generate multiple plan view variants. These parameters will be used by the plan view builder to create one or more plan views.

From operation 502, the method 500 flows to operation 504, where the system receives the plan view configuration in the user interface in order to generate one or more variants. This configuration serves as the foundation for generating various query plan views.

From operation 504, the method 500 flows to operation 506, where the system receives parameters for a specific use case. These parameters define the requirements and constraints for the query plan view generation.

After operation 504, multiple use cases are available to generate different plan views. This allows for the generation of diverse query plan views tailored to different scenarios. At operation 506, parameters are received for a specific use case.

From operation 506, the method 500 flows to operation 508, where the system generates a plan view based on the received parameters for the specific use case. This operation involves creating a representation of the query plan according to the specified configuration and use case requirements.

This solution based on a common baseline configuration for multiple use cases provides several advantages over existing techniques, such as consolidation of shared logic and infrastructure for query plan derivative generation, implementations of use cases can be declarative and be decoupled from the underlying implementation, and the plan view is a powerful abstraction that is not tied to a specific use case but provides a platform for simple extensibility.

Compared to previous solutions, the provided solutions use the plan view abstraction and the declarative approach for multiple use case implementation. Previously, each use case was tightly coupled with the underlying data structures. In the new solution, the two are decoupled.

FIG. 6 is a table 602 describing use cases for query plan representation, according to some examples. The table 602 categorizes each use case based on several criteria, including the base plan representation, type, plan/fragment focus, and redaction requirement.

The Use Case column lists different scenarios or applications for query plan representations, such as "Query Profile," "Public Plan Hash," "Fragment Hash," etc.

The column for Base Plan Representation indicates the foundational type of plan used for the representation. Options include External (visible to customers), Physical (detailed execution operations and resources, such as the physical query plan 202 of FIG. 2), Logical (focuses on logical operations without execution details, such as the logical query plan 102), and Logical/Physical (combines elements of both logical and physical plans).

The column for Type specifies the form of the output. Options include View (a representation of the query plan, possibly visual), Hash (a hash value generated from the plan view), and View/Hash (a view or a hash).

The column for Plan/Fragment specifies whether the view is on the entire plan or on a fragment of the tree. Options include Plan (the entire query plan is considered), Fragment (specific parts of the query plan are considered), and Both (focus on either the entire plan or fragments).

The column for Redaction column indicates whether sensitive information is to be hidden. Options include "Yes: for redacting and "No" for no redacting.

The "Query Profile" use case is for creating the logical query plan 102 and utilizes an external base plan representation, which is classified as a view. This use case operates offline and focuses on the entire plan. Redaction is performed, and normalization and parameterization are considered nice to have.

The "Public Plan Hash" also employs an external base plan representation but is categorized as a hash. The "Public Plan Hash" functions offline, targets the entire plan, requires redaction, and considers normalization/parameterization as nice to have.

The "Fragment Hash" use case uses a physical base plan representation and is a hash type. The use case functions both online and offline, targets fragments, does not require redaction and considers normalization/parameterization as nice to have.

The "Arbitrary Subtree Hash" use case is based on a logical plan representation and is a hash type. The use case operates online, focuses on fragments, does not require redaction, and requires normalization/parameterization.

The "Offline Analysis Hash" use case employs an external base plan representation and is a hash type. The use case functions offline, targets the entire plan, does not require redaction, and considers normalization/parameterization as nice to have.

The "Internal On-Demand Hash" use case utilizes both logical and physical base plan representations and can be either a view or a hash. The use case operates offline, targets both plans and fragments, does not require redaction, and optionally considers normalization/parameterization.

The "Result Cache Hash" use case is based on a physical plan representation and is a hash type. The system functions online, focuses on the entire plan, does not require redaction, and considers normalization and parameterization as nice to have.

A high-level takeaway from the table 602 is that the requirements across many use cases are similar.

The solution involves abstracting the physical and detailed aspects related to the creation of these views or their differing versions. The initial action is to develop an abstraction of a view. A view can be created as an abstraction over the table, yet it consistently retains alignment with the table.

The primary query plan maintained by the compiler serves as the source of truth, while each variant of this plan constitutes a view. A view may be materialized into an independent data structure or memory, or it may exist as a logical view that does not persist any data or impose any memory requirements.

The framework decouples how a view is defined from how the view is generated. This way, various use cases can determine the desired content of their output, such as the specifics of their plan view, without concerning themselves with the actual implementation details involved in traversing the query plan, processing all the nodes, developing individual structures, and maintaining those structures, which the current system accomplishes.

This decoupling of the two phases makes it easy to unify the actual logic that generates these views or the generation of the hashes and allows the user to select the output, knowing that there is a query plan maintained in memory. The user just selects the details desired for the view and maybe a hash of the view, and then the variant is created from the configuration stored in memory for the query plan.

FIG. 7 shows the top part of the user interface for the plan view builder, according to some examples. The framework is based on the PlanViewBuilder, which is both the configuration of what elements of the live query plan are part of the view as well as a declaration of how to build the view (e.g., normalization, subtrees).

One example API/UI of the framework is the following:

```
enum PlanViewType {
LOGICAL,
PHYSICAL,
EXTERNAL // Plan for customer visible use cases
}
enum PlanViewField {
KEYS,
TYPE,
TABLE_TYPE
}
PlanViewBuilder (Plan
    ViewType type, // The base foundation of the view
    boolean defaultExclusive // Optional: Whether the
        builder defaults to
        // inclusion or exclusion for nodes
    boolean enable Versioning // Optional: If versioning is
        enabled, then the
        // hash of the PlanViewGenerator (output of the
            builder) is included
        // in the plan view hash
)
/** Configuration Interface */
includeScan(
    fields=List<PlanViewField>, //Optional: Fields of
        // QueryPlanNodeBaseTableScan to include in the
            view
    filer=Predicate<QueryPlanNodeBaseTableScan>//
        Optional: predicate
        // on properties of a specific instance of the node.
            (e.g., table type,
        // cardinality, etc.)
    )
// Inclusion
include(
    T node,
    field=List<PlanViewField>,
    filter=Predicate<T>
)
// Exclusion
exclude(
    T node,
    field=List<PlanViewField>,
    filter=Predicate<T>
)
// Normalization Rules, represented here as enums, just an
    example
//to illustrate how they can be referenced
enum NormalizationRule {
    NormalizationRule1,
    NormalizationRule2,
    NormalizationRule3
}
// method to add multiple rules as a list
withNormalizationRules (
    List<NormalizationRule>
    )
// Security Controls
// These are policies for how to represent certain pieces of
    information
// in the view
enum SecurityPolicy {
    SecurityPolicy1,
    SecurityPolicy2
```

15

```
}
with SecurityPolicies(
    List<SecurityPolicy>
)
// Groupings
// A GroupingRule is a rule to transform a collection of
    plan nodes
// into a single node.
enum GroupingRule {
    GroupingRule1,
    GroupingRule2,
    GroupingRule3
}
with Groupings(
    List<GroupingRule>
)
// Sequencing
// A means of controlling the order in which the builder
    operates.
// By default, there is no specific ordering to the opera-
    tions
/*
then( ) is an indication to the builder to apply all of the
    steps before this call and then proceed with what
    follows.
e.g builder.
    withNormalizationRules({OrderExpressions}).
    withGroupings(SimplifyMvFragment).
    then( ).excludeProjection( )
The execution of a builder configuration w/a then call can
    be thought of as the nested of query blocks in SQL
*/
then( );
// Fragment Selection
// This method allows a user to only build a plan view on
    fragments of the
// plan as defined here
extractFragments(
    start={<NODE_TYPE>,              <INCLUD-
        E_START_NODE>},
        // the type of the node to start fragment collection and
            whether the
        // node is included in the fragment
    end={<NODE_TYPE>,              <INCLUDE_END-
        _NODE>}//Optional: If
        // omitted, then the default is to select all nodes to the
            leaf
    )
// Plan Filtering
filterPlanProperties(
Predicate<QueryPlanProperties> // A filter on properties
    of the plan
)
/** Execution Interface */
// Build view returns a PlanView object, which is an
    in-memory instance of
// the structure. It can be further transformed, modified,
    displayed, or
// hashed.
PlanView buildView( )
// Build the hash of a plan/fragment. This directly hashes
    the
// constituent parts of the node and triggers hash genera-
    tion of child nodes.
```

16

```
// There is no materialization of a plan view and only the
    hash is returned
PlanHash buildHash( )
// Build a string signature of a plan/fragment
PlanSignature buildSignature( )
// Returns an instance of a PlanViewGenerator, which is
    the class
// responsible for building a view, hash, signature
PlanViewGenerator build( )
```

QueryPlanNode is a class in the compiler that represents the query plan, a single operator within the query plan tree. During compilation, the QueryPlanNode represents one of the operators in the physical query plan 202. The class will define items, such as a child and a parent. The QueryPlan-Node maintains a list of expressions or definitions of what the QueryPlanNode outputs.

The goal of maintaining this information is to send a configuration that is serialized into something workable by the execution engine. For example, for the hash join probe node, the QueryPlanNode internally maintains all the pertinent information, which is then sent to the execution engine to execute the query correctly.

Other aspects are maintained outside of this class implementation, so there is no connection between views and query plan nodes beyond what is shown to users.

The process to create a view includes two operations: the plan view builder and the plan view generator. The PlanViewBuilder allows the user to set parameters for the view.

The PlanViewGenerator produces the view or hash according to the use case. The PlanViewGenerator is the counterpart to the plan view builder and takes the definition that the plan view builder outputs and generates a plan view that matches the configuration created by the PlanViewBuilder.

By decoupling the builder from the generators of the different views, the system can determine which definitions are identical and what work can be shared among the variants. The ability to perform certain tasks once and share the results across multiple use cases is a benefit of separating the definition from the generation.

The framework is designed to offer simplicity to users by providing multiple options within a plan node. It permits the configuration of every field associated with each operator. However, diagnostic analysis of various use cases indicates that only a specific subset of elements are typically selected by users. Consequently, the framework concentrates on supplying a straightforward interface concentrating on those common elements. For additional use cases, the framework allows advanced users to select less common options in the configuration.

The PlanViewBuilder provides a plurality of methods. For the configuration interface, the method includeScan is provided. The includeScan method is used to specify if a node T is included or excluded in a plan view. This method allows users to define a list of fields that are relevant to their specific use case. Additionally, it provides an optional predicate filter to apply conditions on properties of a specific instance of the node, such as table type or cardinality. This enables customization of the plan view to include only the desired scan operations based on the defined criteria.

The inclusion method in the PlanViewBuilder configuration interface are used to specify which nodes of a query plan should be included in a plan view based on the specified. These methods allow users to define specific components relevant to their use case.

One example of an inclusion method is includeScan, which specifies fields of a QueryPlanNodeBaseTableScan to include in the view, with optional predicates for filtering based on properties like table type or cardinality.

The exclusion methods in the PlanViewBuilder configuration interface are used to specify which nodes of a query plan should be excluded from a plan view based on specified filtering criteria. These methods allow users to define specific components that are not relevant to their use case.

One example of an exclusion method is excludeJoin, which excludes join operations from the plan view, allowing customization based on specific criteria.

The NormalizationRule method in the PlanViewBuilder framework is used to apply specific normalization rules to a query plan. These rules standardize expressions within the plan to ensure consistency. In some examples, normalization may involve ParameterizeConstants (abstracts constants and literals to create a more generalized representation), Order-Expressions (canonicalizes expression lists to maintain a consistent order), and SimplifyExpressions (applies simplification techniques to expressions for uniformity).

The security controls in the PlanViewBuilder framework apply security policies to a query plan view. These policies determine how certain pieces of information are represented in the view, ensuring sensitive data is appropriately handled. In some examples, the security controls may include HideSecureObjects (ensures that secure objects are not exposed in the plan view) and MaskLiterals (masks literal values to prevent exposure of sensitive information). These controls are integrated into the plan view configuration, allowing users to enforce security measures consistently across different query plan views.

The GroupingRule method applies specific rules to transform a collection of plan nodes into a single node. Grouping has the goal of collapsing a physical plan fragment into a logical one. By applying these rules, the system can reduce complexity and improve the performance of the process.

Sequencing provides a way of controlling the order in which the builder operates. By default, there is no specific ordering for the operations of the query plan.

The fragment selection method in the PlanViewBuilder allows users to build a plan view on specific fragments of the query plan. This method is defined by specifying the start and end nodes of the fragment collection: the start node is the type of node where the fragment collection begins, and whether this node is included in the fragment; and the end node optionally specifies the type of node where the fragment collection ends. If omitted, the default is to select all nodes to the leaf.

The plan filtering method filterPlanProperties in the PlanViewBuilder allows users to apply filters to the properties of the query plan. This method involves specifying predicates that determine which elements of the plan should be included or excluded based on certain criteria.

The PlanViewBuilder creates a PlanView object, which is an in-memory instance of the configuration structure. This object can be further transformed, modified, displayed, or hashed to create the plan views.

The execution interface provides methods to generate different outputs from the configured plan view generated by the PlanViewBuilder. Some examples include:

BuildView, to build a view, returns a PlanView object, which is an in-memory instance of the structure. This can be further transformed, modified, displayed, or hashed. It serves as a replacement for the QueryProfile. The BuildHash directly hashes the constituent parts of the node and triggers the hash generation of child nodes. There is no materialization of a plan view, and the hash is returned. For sub-tree hashes, the hash is comprised of all nodes from a subtree root to all leaves. For fragments (an arbitrarily connected part of the plan tree), the configuration will dictate the boundary of the fragment. Further, the leaves of the fragment will not include the hash of its child and instead will treat its inputs as base columns.

BuildSignature generates a signature, creating an instance of a PlanViewGenerator, which is the class responsible for building a view, hash, or signature.

This is an extensible framework, and new methods may be included easily. Currently, when a developer wants to add a new feature, a new tree structure is created. However, there is no existing method for sharing this implementation. In contrast, the plan view framework enables users to incorporate new features within the framework, thereby rendering these features accessible to other users generating additional plan views. This process introduces automatic extensibility to the framework.

The PlanViewBuilder provides a development environment, where the options are provided to the user as the user writes the code, such as methods available and parameters for the method once selected. The developer gets automatic hints and other features, such as auto-completion, that would show the available options.

For example, for normalization rules, users can selectively choose from a plurality of normalization rules.

Versioning, the assignment of version identifiers to the framework version, is valuable for certain use cases where a breaking change to the framework occurs or when there is a change not associated with the plan view or the specifics of the plan view itself. The framework provides a mechanism for versioning both plan views and version hashes.

For example, a user executes a query labeled as X. The query plan or its associated public hash undergoes modification despite the absence of any alterations in the customer's data, the query itself, or any substantial changes from the customer's viewpoint. This modification is attributable to alterations in the framework responsible for generating these hashes. Previously, the hash was identified as N on version one; currently, the hash is identified as X on version two, yet the two hashes are equivalent.

Customization rules encompass the general concept that corresponds to the inputs of the normalization, security, and grouping interfaces of the framework. Consolidation of common logic into a single rule facilitates consistent behavior across all plan nodes. Challenges such as security vulnerabilities or missing information become more manageable through the uniform application of a rule to all nodes.

In some examples, the following two simple interfaces are provided for a plan view rule:

```
interface PlanViewExpressionRule {
  PlanViewRule createRule(String ruleName, String
    ruleDescription);
  boolean match(SqlExpression expression);
  SqlExpression apply(SqlExpression expression);
}
interface PlanViewNodeRule {
  PlanViewRule createRule(String ruleName, String
    ruleDescription);
  boolean match(QueryPlanNode planNode);
  PlanNode apply(QueryPlanNode planNode);
}
```

The PlanViewExpressionRule is an interface used to define rules for expressions within a query plan and provides a structure for creating and applying rules to standardize or modify expressions. The interface includes the following methods: createRule (initializes a rule with a name and description), match (determines if a given SQL expression matches the criteria defined by the rule), and apply (applies the rule to a matching SQL expression, transforming it as needed).

The PlanViewNodeRule is an interface used to define rules for nodes within a query plan and provides a structure for creating and applying rules to standardize or modify nodes. The interface includes the following methods: createRule (initializes a rule with a name and description), match (determines if a given query plan node matches the criteria defined by the rule), and apply (applies the rule to a matching query plan node, transforming it as needed).

FIG. 8 shows an example of creating an external plan with a grouping of fragments, according to some examples. This example illustrates how to build a plan view using the PlanViewBuilder framework. The example configures and builds a plan view by setting the base plan type, applying versioning, normalization rules, grouping rules, and excluding specific nodes based on a filter condition.

```
//Use case
PlanView view=PlanViewBuilder.basePlan(External)
    .withVersion(V1)
    .applyNormalizationRules(
        {Rules}
    )
    .applyGroupings(
        {GroupingRules}
    )
    .excludeNode(<
        NODE_NAME>, ( )→{<filter_condition>}
    )
    .buildView( );
```

The PlanView view=PlanViewBuilder.basePlan (External) instruction initializes the PlanViewBuilder with a base plan type of External, which indicates that the plan view is intended for customer-visible use cases.

The .withVersion(V1) instruction sets the version of the plan view to V1. Versioning is used for tracking changes and ensuring consistency across different versions of the plan view.

The method .applyNormalizationRules({Rules}) applies a set of normalization rules to the plan view. Normalization rules standardize expressions within the query plan to ensure consistency. Further, the method .applyGroupings({GroupingRules}) applies a set of grouping rules to the plan view. Grouping rules consolidate multiple operators or expressions into a single logical unit within the query plan.

Also, .excludeNode(<NODE_NAME>, ( )>→ {<filter_condition>}) is a method for excluding nodes from the plan view based on a filter condition. The <NODE_NAME> placeholder represents the type of node to be excluded, and the <filter_condition> placeholder represents the condition that determines which nodes to exclude.

The .buildView( ) instruction builds the PlanView object based on the specified parameters and rules. The resulting PlanView object is an in-memory instance of the structure that can be further transformed, modified, displayed, or hashed.

Another example is for a logical plan view of joins and tables. The instructions are:

```
PlanViewBuilder builder=new PlanViewBuilder (LOGI-
    CAL, EXCLUSIVE, VERSIONING_DISABLED);
PlanView plan View=builder
.includeJoin(fields={JOIN_TYPE})
.includeScan(fields={TABLE_TYPE})
.buildView( );
```

Another example is for creating a physical plan hash with normalization rules. The instructions are:

```
PlanViewBuilder    builder=new    PlanViewBuilder(EX-
    TERNAL, INCLUSIVE, VERSIONING_ENABLED);
PlanView view=builder
.withNormalizationRules(
ParameterizeConstants)
)
.applyGroupings(
SimplifyGroupingSetFragment,
)
.applySecurityPolicies(
RedactLiterals
)
.buildView( );
PlanHash hash=view.generateHash( ); // This is the public
    plan hash
ExternalExplain explain=view.generateExplain( ); // This
    is the external
    // explain
```

Two examples of the implementation of customization rules are provided below. The first example of customization rules is for a plan node grouping rule. The instructions are:

```
class    GroupingSetsGroupingRule    implements    Plan-
    ViewNodeRule {
    String ruleName;
    String ruleDescription;
    MatchGroupingSetsFragment Visitor matching Visitor;
    ReplaceGroupingSetsFragment    Visitor    replacement
        Visitor;
    Map<QueryPlanNode, QueryPlanNode> grouping-
        SetFragmentMap;
    // A second map keeping track of the parent of a
        grouping set head
    // node, this avoids having to visit the tree in the apply
        phase
    // assumption: single parent
    Map<QueryPlanNode,            QueryPlanNode>
        groupingSetParent2HeadMap;
    PlanViewRule    createRule    (String    ruleName,    String
        ruleDescription) {
        matching Visitor=new MatchGroupingSetsFragment
            Visitor ( );
    }
    boolean match(QueryPlanNode planNode) {
    matchingVisitor.visit(expression);
    groupingSetFragments=matchingVisitor.
        getMatchedFragments( );
    }
    PlanNode apply(PlanNode planNode) {
    // here, we assume the input expression is the same
        mem ref as what
    // was passed to match.
        for    (var    parent:    grouingSetParent2HeadMap.
            keySet( )) {
            var    head=groupingSetParent2HeadMap.get(par-
                ent);
            var tail=groupGroupingSetFragment.get(head);
            var
                replacementNode=groupGroupingSetFragment
                (head, tail);
            var parent.setChild(replacementNode);
        }
        return planNode;
    }
    private QueryPlanNode groupGroupingSetFragment
        (QueryPlanNode head,
```

```
QueryPlanNode tail) {
    // grouping logic
  }
}
```

The QueryPlanNode (QPN) is an important part of the framework to leverage the rich information maintained in the QPN. A new interface is presented to be implemented by the QPNs as follows:

```
public interface PlanViewable {
public   ImmutableQueryPlanNode   buildLogicalPlan-
    Node(
    PlanViewQPNConfig config);
public int hashLogicalPlanNode(
    PlanViewQPNConfig config);
public   ImmutableQueryPlanNode   buildExternalPlan-
    Node(
    PlanViewQPNConfig config);
public int hashExternalPlanNode(
    PlanViewQPNConfig config);
public   ImmutableQueryPlanNode   buildPhysicalPlan-
    Node(
    PlanViewQPNConfig config);
public int hashPhysicalPlanNode(
    PlanViewQPNConfig config);
}
```

This interface either returns a hash value or an immutable version of a PlanNode. The input to this QPN method is a reference to the PlanViewQPNConfig object that contains the information for a node to select the right attributes and apply the right set of normalization rules:

```
class PlanViewQPNConfig {
boolean isNodeIncludes(class QPNClass);
    boolean hasPrecondition(class QPNClass);
    boolean   checkPrecondition(QueryPlanNode   plan-
        Node);
    List<PlanAttributes>       getRequiredAttributes(class
        QPNClass);
    // Returns the class responsible for applying normal-
        ization rules on
    // scalar expressions
    ExpressionNormalizer getExpressionNormalizer( );
    // Returns the class responsible for applying normal-
        ization rules on
    // db entities
    // Note: We could have a single normalizer class, but
        the
    // implementation of each domain is likely going to be
        significantly
    // different.
ObjectNormalizer getObjectNormalzier( );
}
```

A PlanViewQPNConfig object provides the necessary information for a QPN to determine the following:

Is it included in this view/hash generation pass?

Does it pass any precondition even if the class is included?

What attributes are required.

What normalization rules need to be run on expressions and entities.

A plan node can map attributes in a configuration to its own member variables. In the PlanViewBuilder framework, a limited set of supported attributes are kept. In some examples, these are the provided attributes:

KEYS (covers key expressions across all operators)

EVALUATED_EXPRESSIONS     (covers     evaluated expressions across operators);

TYPE;

CARDINALITY_ESTIMATE; and

HINT ALIAS

On the QPN side, these enums will either map to APIs that exist in the base class QueryPlanNode.java or concrete QueryPlanNodes can implement their own logic for providing this information. This does not overcomplicate the general usage of specific attribute selection both in the interface and implementation. If there is some specific use case where the enums are not sufficient, users will have the option of overriding the QPN logic within the plan view configuration code.

An interface PlanViewable is provided for the QPN nodes. In some examples, the interface is as follows:

```
public interface PlanViewable {
    public   ImmutableQueryPlanNode   buildLogicalPlan-
        Node(
        PlanViewQPNConfig config);
    public int hashLogicalPlanNode(
        PlanViewQPNConfig config);
    public   ImmutableQueryPlanNode   buildExternalPlan-
        Node(
        PlanViewQPNConfig config);
    public int hashExternalPlanNode(
PlanViewQPNConfig config);
    public   ImmutableQueryPlanNode   buildPhysicalPlan-
        Node(
        PlanViewQPNConfig config);
    public int hashPhysicalPlanNode(
        PlanViewQPNConfig config);
}
```

The interface PlanViewable is designed to provide a structured way to generate and hash different types of query plan nodes, including methods for building and hashing logical, external, and physical plan nodes. Each method takes a PlanViewQPNConfig object as a parameter, which contains the configuration for the node.

The methods include:

buildLogicalPlanNode   (PlanViewQPNConfig   config), constructs an immutable logical plan node based on the provided configuration;

hashLogicalPlanNode (PlanViewQPNConfig config) generates a hash for the logical plan node using the specified configuration;

buildExternalPlanNode   (PlanViewQPNConfig   config) creates an immutable external plan node according to the given configuration;

hashExternalPlanNode   (PlanViewQPNConfig   config) computes a hash for the external plan node using the provided configuration;

buildPhysicalPlanNode   (PlanViewQPNConfig   config) builds an immutable physical plan node based on the configuration; and hashPhysicalPlanNode   (PlanViewQPNConfig   config) produces a hash for the physical plan node using the specified configuration.

This interface ensures that each query plan node can consistently generate its various representations and corresponding hashes, maintaining a unified approach across different types of nodes.

Each node knows how to generate its source-of-truth version of these three variants, and from there, the views are constructed. A first operation for constructing a view is, given a definition, to traverse the in-memory query plan that is being operated on by the compiler. For all nodes, one of these methods is called.

The user can select to build a logical plan node, which would generate a collection of query plan nodes that are of the logical type, build a corresponding tree in memory, and then apply the rest of the plan view builder configuration. The reason for this is that the query plan node is accepted as the source of truth, and it should maintain how it generates its variant.

Returning to the example illustrated in FIG. 8 for a logical plan view with grouping, the user can specify, "I have a PlanView, and I want to create a builder object which will build up the definition of my view, and I want to specify various things."

There is a set of normalization rules, and the user may select from them. Similarly, nodes can be grouped together with applyGroupings. If the user wants to have a hybrid plan that has partially physical information and partially logical information, some previously defined groupings can be applied. A security policy can be set applySecurityPolicies (HideSecureObjects).

FIG. 9 is a flowchart of a method 900 for generating a query plan representation based on a common query plan configuration, according to some examples. While the various operations in this flowchart are presented and described sequentially, one of ordinary skill will appreciate that some or all of the operations may be executed in a different order, be combined or omitted, or be executed in parallel.

At operation 902, the system provides a user interface (UI) for a development tool to create a configuration for a plan builder. This operation involves setting up an interface that allows users to define the parameters and settings necessary for constructing a query plan representation.

From operation 902, the method 900 flows to operation 904 to provide a plan view generator in the UI with options to create a plurality of query plans based on the configuration. The plurality of query plans comprises a logical query plan, a physical query plan, a query plan hash, and a query plan signature.

From operation 904, the method 900 flows to operation 906 for receiving, in the UI, parameters to create the configuration and select a query plan from the plurality of query plans.

From operation 906, the method 900 flows to operation 908 for generating a first query plan based on the parameters. This operation involves the actual creation of the query plan using the defined configuration and selected parameters, resulting in a specific query plan tailored to the user needs.

From operation 908, the method 900 flows to operation 910, where the system causes presentation of the first query plan on a display. This operation involves rendering the generated query plan on a display device.

In view of the disclosure above, various examples are set forth below. It should be noted that one or more features of an example, taken in isolation or combination, should be considered within the disclosure of this application.

Example 1. A system comprising: a memory comprising instructions; and one or more computer processors, the instructions, when executed by the one or more computer processors, causing the system to perform operations comprising: providing a user interface (UI) for a development tool to create a configuration for a plan builder; providing a plan view generator in the UI with options to create a plurality of query plans based on the configuration, the plurality of query plans comprising a logical query plan, a physical query plan, a query plan hash, and a query plan signature; receiving, in the UI, parameters to create the configuration and select a query plan from the plurality of query plans; generating a first query plan based on the parameters; and causing presentation of the first query plan on a display.

Example 2. The system of any one or more of Example 1, wherein the first query plan comprises a sequence of operations used to execute a database query.

Example 3. The system of any one or more of Examples 1-1, wherein the plurality of query plans comprises a logical query plan comprising logical operations for executing a database query, the logical query plan comprising nodes in a tree structure for executing the first query plan.

Example 4. The system of any one or more of Examples 1-3, wherein the plurality of query plans comprises a physical query plan that comprises a detailed representation of the first query plan with execution operations to implement the first query plan and operators used to process data at different stages of implementation of the first query plan.

Example 5. The system of any one or more of Examples 1-4, wherein the UI comprises customization rules to apply modifications for a query plan view, the customization rules comprising normalization, parameterization, redaction, and grouping.

Example 6. The system of any one or more of Examples 1-5, wherein the plan builder comprises an include-scan method to specify fields of a node to include in a plan view.

Example 7. The system of any one or more of Examples 1-6, wherein the plan builder comprises an include-join method to specify fields of a join operation to be implemented in a node of a plan view.

Example 8. The system of any one or more of Examples 1-7, wherein the plan builder comprises an include-group-by method to specify fields of a group-by operation.

Example 9. The system of any one or more of Examples 1-8, wherein the plan builder comprises an exclude-scan method to remove specified types of scan nodes with optional predicates to filter out nodes.

Example 10. The system of any one or more of Examples 1-9, wherein the plan builder comprises a normalization-rule method to apply a normalization rule to the query plan.

Example 11. A computer-implemented method comprising: providing a user interface (UI) for a development tool to create a configuration for a plan builder; providing a plan view generator in the UI with options to create a plurality of query plans based on the configuration, the plurality of query plans comprising a logical query plan, a physical query plan, a query plan hash, and a query plan signature; receiving, in the UI, parameters to create the configuration and select a query plan from the plurality of query plans; generating a first query plan based on the parameters; and causing presentation of the first query plan on a display.

Example 12. The method of any one or more of Example 11, wherein the plurality of query plans comprises a logical query plan comprising logical operations for executing a database query, the logical query plan comprising nodes in a tree structure for executing the first query plan.

Example 13. The method of any one or more of Examples 11-12, wherein the plurality of query plans comprises a physical query plan that comprises a detailed representation of the first query plan with execution operations to implement the first query plan and operators used to process data at different stages of implementation of the first query plan.

Example 14. The method of any one or more of Examples 11-13, wherein the UI comprises customization rules to apply modifications for a query plan view, the customization rules comprising normalization, parameterization, redaction, and grouping.

Example 15. The method of any one or more of Examples 11-14, wherein the plan builder comprises an include-scan method to specify fields of a node to include in a plan view.

Example 16. A machine-storage medium including instructions that, when executed by a machine, cause the machine to perform operations comprising: providing a user interface (UI) for a development tool to create a configuration for a plan builder; providing a plan view generator in the UI with options to create a plurality of query plans based on the configuration, the plurality of query plans comprising a logical query plan, a physical query plan, a query plan hash, and a query plan signature; receiving, in the UI, parameters to create the configuration and select a query plan from the plurality of query plans; generating a first query plan based on the parameters; and causing presentation of the first query plan on a display.

Example 17. The machine-storage medium of any one or more of Example 16, wherein the plurality of query plans comprises a logical query plan comprising logical operations for executing a database query, the logical query plan comprising nodes in a tree structure for executing the first query plan.

Example 18. The machine-storage medium of any one or more of Examples 16-17, wherein the plurality of query plans comprises a physical query plan that comprises a detailed representation of the first query plan with execution operations to implement the first query plan and operators used to process data at different stages of implementation of the first query plan.

Example 19. The machine-storage medium of any one or more of Examples 16-18, wherein the UI comprises customization rules to apply modifications for a query plan view, the customization rules comprising normalization, parameterization, redaction, and grouping.

Example 20. The machine-storage medium of any one or more of Examples 16-19, wherein the plan builder comprises an include-scan method to specify fields of a node to include in a plan view.

Figure 10:
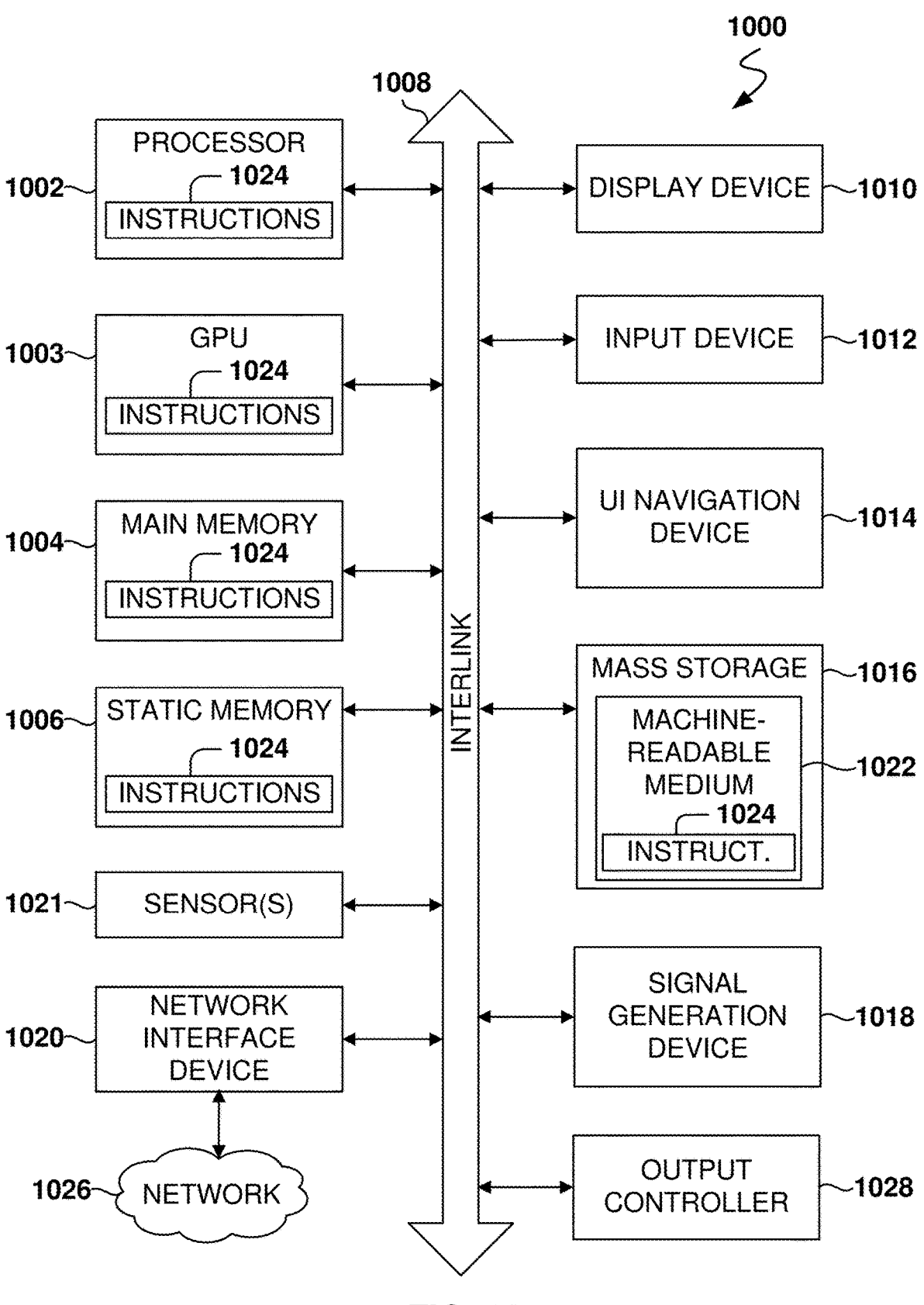
FIG. 10 is a block diagram illustrating an example of a machine upon or by which one or more example process examples described herein may be implemented or controlled.

FIG. 10 is a block diagram illustrating an example of a machine 1000 upon or by which one or more example process examples described herein may be implemented or controlled. In alternative examples, the machine 1000 may operate as a standalone device or be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1000 (e.g., computer system) may include a hardware processor 1002 (e.g., a central processing unit (CPU), a hardware processor core, or any combination thereof), a graphics processing unit (GPU 1003), a main memory 1004, and a static memory 1006, some or all of which may communicate with each other via an interlink 1008 (e.g., bus). The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device 1016 (e.g., drive unit), a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1002 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1002 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1002 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1002 may be emulated in software, running on a physical processor, as a virtual processor or virtual circuit. The virtual processor may behave like an independent processor but is implemented in software rather than hardware.

The mass storage device 1016 may include a machine-readable medium 1022 on which one or more sets of data structures or instructions 1024 (e.g., software) embodying or utilized by any of the techniques or functions described herein. The instructions 1024 may also reside, completely or at least partially, within the main memory 1004, within the static memory 1006, within the hardware processor 1002, or the GPU 1003 during execution thereof by the machine 1000. For example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium or multiple media (e.g., a centralized or distributed database and associated caches and servers) configured to store one or more instructions 1024.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The term "machine-readable medium" may include any medium that is capable of storing, encoding, or carrying instructions 1024 for execution by the machine 1000 and that causes the machine 1000 to perform any one or more of the techniques of the present disclosure or that is capable of storing, encoding, or carrying data structures used by or associated with such instructions 1024. Non-limiting machine-readable medium examples may include solid-state memories and optical and magnetic media. For example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media.

The instructions 1024 may be transmitted or received over a communications network 1026 using a transmission medium via the network interface device 1020. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1024 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A system comprising:
one or more computer processors; and
a memory comprising instructions that, when executed by the one or more computer processors, cause the system to perform operations comprising:
providing a user interface (UI) for a development tool to create a configuration for a plan builder;
providing a plan view generator in the UI with options to create a plurality of query plans based on the configuration, the plurality of query plans comprising a logical query plan, a physical query plan, a query plan hash, and a query plan signature;
receiving, in the UI, parameters to create the configuration and select a query plan from the plurality of query plans;
generating a first query plan based on the parameters; and
causing presentation of the first query plan on a display.

2. The system as recited in claim 1, wherein the first query plan comprises a sequence of operations used to execute a database query.

3. The system as recited in claim 1, wherein the plurality of query plans comprises a logical query plan comprising logical operations for executing a database query, the logical query plan comprising nodes in a tree structure for executing the first query plan.

4. The system as recited in claim 1, wherein the plurality of query plans comprises a physical query plan that comprises a detailed representation of the first query plan with execution operations to implement the first query plan and operators used to process data at different stages of implementation of the first query plan.

5. The system as recited in claim 1, wherein the UI comprises customization rules to apply modifications for a query plan view, the customization rules comprising normalization, parameterization, redaction, and grouping.

6. The system as recited in claim 1, wherein the plan builder comprises an include-scan method to specify fields of a node to include in a plan view.

7. The system as recited in claim 1, wherein the plan builder comprises an include-join method to specify fields of a join operation to be implemented in a node of a plan view.

8. The system as recited in claim 1, wherein the plan builder comprises an include-group-by method to specify fields of a group-by operation.

9. The system as recited in claim 1, wherein the plan builder comprises an exclude-scan method to remove specified types of scan nodes with optional predicates to filter out nodes.

10. The system as recited in claim 1, wherein the plan builder comprises a normalization-rule method to apply a normalization rule to the query plan.

11. A computer-implemented method comprising:
providing a user interface (UI) for a development tool to create a configuration for a plan builder;
providing a plan view generator in the UI with options to create a plurality of query plans based on the configuration, the plurality of query plans comprising a logical query plan, a physical query plan, a query plan hash, and a query plan signature;
receiving, in the UI, parameters to create the configuration and select a query plan from the plurality of query plans;
generating a first query plan based on the parameters; and
causing presentation of the first query plan on a display.

12. The method as recited in claim 11, wherein the plurality of query plans comprises a logical query plan comprising logical operations for executing a database query, the logical query plan comprising nodes in a tree structure for executing the first query plan.

13. The method as recited in claim 11, wherein the plurality of query plans comprises a physical query plan that comprises a detailed representation of the first query plan with execution operations to implement the first query plan and operators used to process data at different stages of implementation of the first query plan.

14. The method as recited in claim 11, wherein the UI comprises customization rules to apply modifications for a query plan view, the customization rules comprising normalization, parameterization, redaction, and grouping.

15. The method as recited in claim 11, wherein the plan builder comprises an include-scan method to specify fields of a node to include in a plan view.

16. A machine-storage medium including instructions that, when executed by a machine, cause the machine to perform operations comprising:
providing a user interface (UI) for a development tool to create a configuration for a plan builder;
providing a plan view generator in the UI with options to create a plurality of query plans based on the configuration, the plurality of query plans comprising a logical query plan, a physical query plan, a query plan hash, and a query plan signature;
receiving, in the UI, parameters to create the configuration and select a query plan from the plurality of query plans;
generating a first query plan based on the parameters; and
causing presentation of the first query plan on a display.

17. The machine-storage medium as recited in claim 16, wherein the plurality of query plans comprises a logical query plan comprising logical operations for executing a database query, the logical query plan comprising nodes in a tree structure for executing the first query plan.

18. The machine-storage medium as recited in claim 16, wherein the plurality of query plans comprises a physical query plan that comprises a detailed representation of the first query plan with execution operations to implement the first query plan and operators used to process data at different stages of implementation of the first query plan.

19. The machine-storage medium as recited in claim 16, wherein the UI comprises customization rules to apply modifications for a query plan view, the customization rules comprising normalization, parameterization, redaction, and grouping.

20. The machine-storage medium as recited in claim 16, wherein the plan builder comprises an include-scan method to specify fields of a node to include in a plan view.

* * * * *